Figure 1:
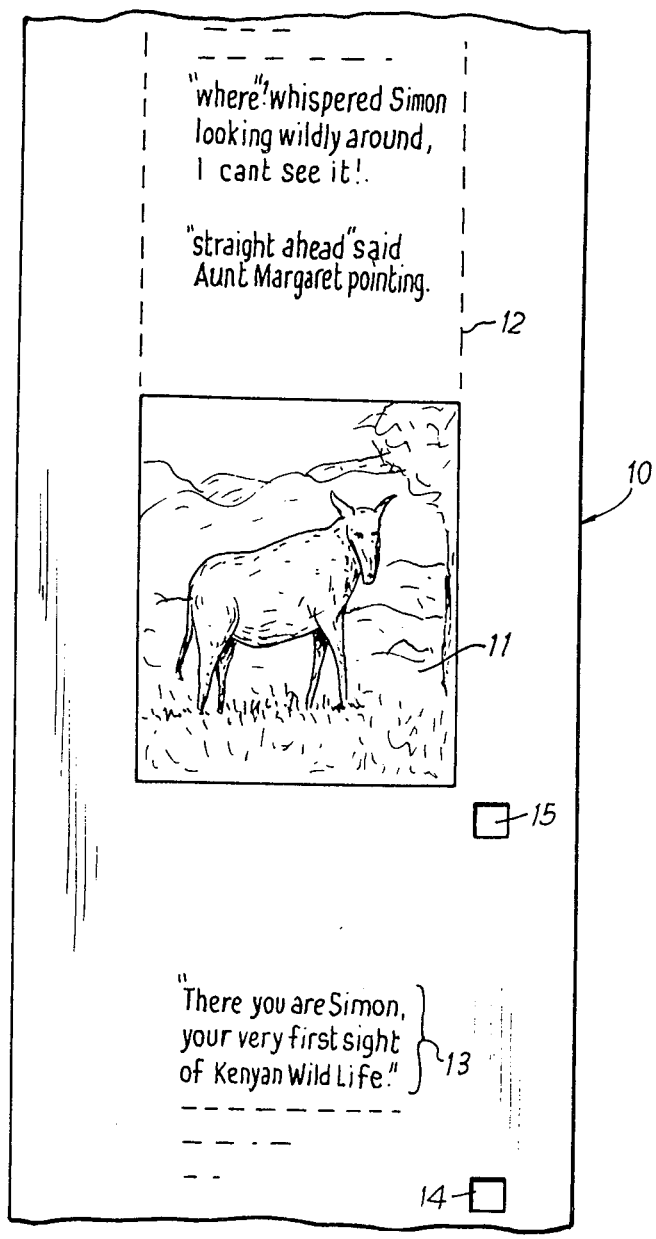

United States Patent [19]

Fraser

[11] 4,105,315
[45] Aug. 8, 1978

[54] MICROFILM READING SYSTEM

[76] Inventor: Ian Duncan Fraser, Delfield, Funtington, Chichester, Sussex PO18 96 G, England

[21] Appl. No.: 731,438

[22] Filed: Oct. 12, 1976

[51] Int. Cl.² .................. G09B 17/00; G03B 1/22; G03B 1/32
[52] U.S. Cl. ...................... 353/95; 35/35 B; 352/168; 353/122
[58] Field of Search ............... 35/35 B, 35 G, 35 H; 351/30, 31; 352/168, 169; 353/95, 122

[56] References Cited

U.S. PATENT DOCUMENTS

| | | | |
|---|---|---|---|
| 2,188,210 | 1/1940 | Smith | 35/35 B |
| 3,354,776 | 11/1967 | Smitzer et al. | 353/26 R |
| 3,432,228 | 3/1969 | Hellmund | 352/169 |
| 3,502,406 | 3/1970 | Macomber | 35/35 B |
| 3,862,799 | 1/1975 | Smith et al. | 353/88 |

Primary Examiner—Steven L. Stephan
Attorney, Agent, or Firm—Dike, Bronstein, Roberts, Cushman & Pfund

[57] ABSTRACT

To facilitate reading by reducing eye movement, reading matter recorded on microfilm is arranged in a column with not more than 26 characters, including spaces, per line. The microfilm record is read with the aid of an apparatus which optically magnifies the record and advances it continuously at a controllable speed in the direction of the column to present successive lines to the eye. Illustrations may be placed at the required position in the text and the reading apparatus is constructed to move a picture rapidly into and out of the viewing position and hold it stationary for viewing.

5 Claims, 6 Drawing Figures

MICROFILM READING SYSTEM

This invention concerns a microfilm reading system. For convenience, the term microfilm is used in this specification to include microfiche as well as film in length.

Existing microfilm systems are primarily concerned with the space saving which results from photographing documents in a reduced scale on microfilm and in consequence, known microfilm reading apparatus is designed to enable an individual frame of the microfilm record, containing a whole page of printed or other reading matter, to be selected and presented to the reader. The operation of such apparatus is necessarily intermittent because the selected image has to be stationary while it is being read by the user of the apparatus. The present invention, on the other hand, is concerned to facilitate the reading process and for this purpose uses specially prepared microfilm records in conjunction with specially designed reading apparatus. Instead of storage and retrieval of pages of conventional reading matter the invention provides reading matter in an entirely new format.

It is an object of the invention to provide a reading system which facilitates the reading process and can therefore promote rapid reading and help people with impaired vision or other handicaps to read. To this end, the invention takes advantage of the known virtues of microfilm, especially its compactness.

In accordance with the invention a microfilm record has reading material arranged in one or more columns of lines of characters and the length of each line of each column is restricted to not more than 26 characters, including spaces.

The restriction on the number of characters per line is intended to facilitate reading by minimising the eye movement necessary for comprehension of each line. It is found that when the line is magnified and presented to the reader at a size convenient for reading, the eye can comprehend a line of up to 26 characters without significant lateral movement. The number of characters which can be read without significant lateral movement of the eye will vary according to the type face and type size and even from one reader to another, but it appears that for most practical purposes 26 characters (including spaces) is the maximum. This number is somewhat less than that typically employed in newspaper columns. The number of characters may be less than 26, and it is desirable to ensure, as far as possible, that each line contains a complete "thought unit" comprehensible in one glance by eye and brain.

An example of a layout follows:

This invention concerns
microfilm and apparatus
for reading microfilm
For convenience The advantage of this layout is that it enables the eye to read without the customary scanning of the eye along a line and flick-back to the beginning of the next line. If an enlarged image of part of the column on the microfilm, comprising only a few lines of characters, is presented to the reader and if the image is moved at a suitable rate down the column, the reader does not have to perform any eye movement to comprehend the text. What is more, the arrangement of the lines in a continuous moving column, in contrast to the breaking up of text into pages, enables long passages of text to be presented to the reader without interruption, and several columns can be arranged side by side on a single piece of microfilm, for example, a microfiche, for reproduction in succession.

Another advantage of the layout is that when, in a textbook, for example, it is necessary to show the reader a picture or diagram, this can be inserted in exactly the appropriate place in the column.

In accordance with the invention viewing apparatus for use in conjunction with the novel microfilm record has an optical magnification system which presents an enlarged image of part of the length of a column to the reader in the correct orientation for reading, and a drive system which effects continuous transport of the microfilm record in the direction of the column, thereby presenting successive lines of the column to the reader.

Preferably, the microfilm is in strip form and is carried in a cassette containing spools on which the film is wound.

When the film includes illustrations the viewing apparatus is provided with means for stopping the normal continuous feed of the film and placing the picture in position for viewing. The reading apparatus may have an independent picture drive mechanism comprising a sensing device for sensing the pressure of a picture on the microfilm record, means for disengaging the continuous drive system, a pull-down to move the picture rapidly into position for viewing by the optical system, and a manually-operable control to restart the continuous drive system.

Figure 2:
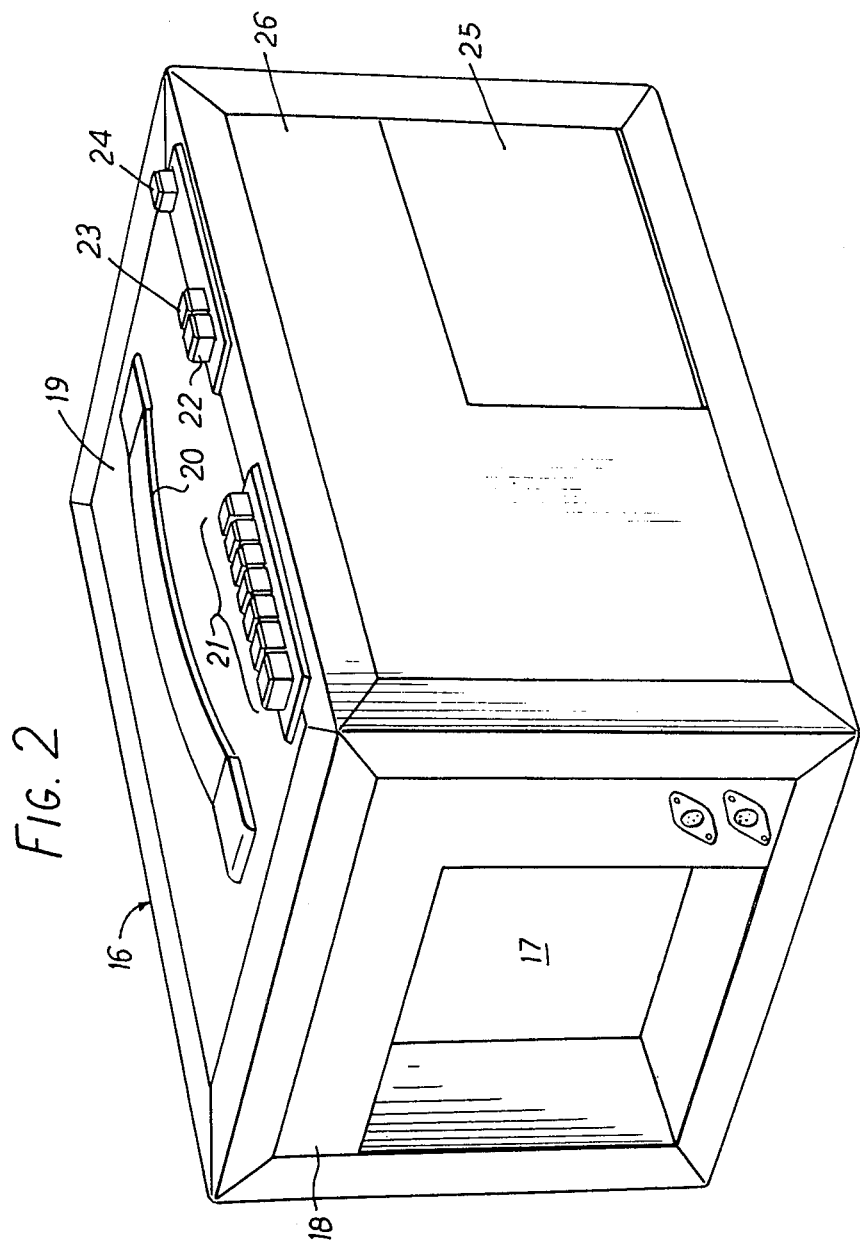
Figure 3:
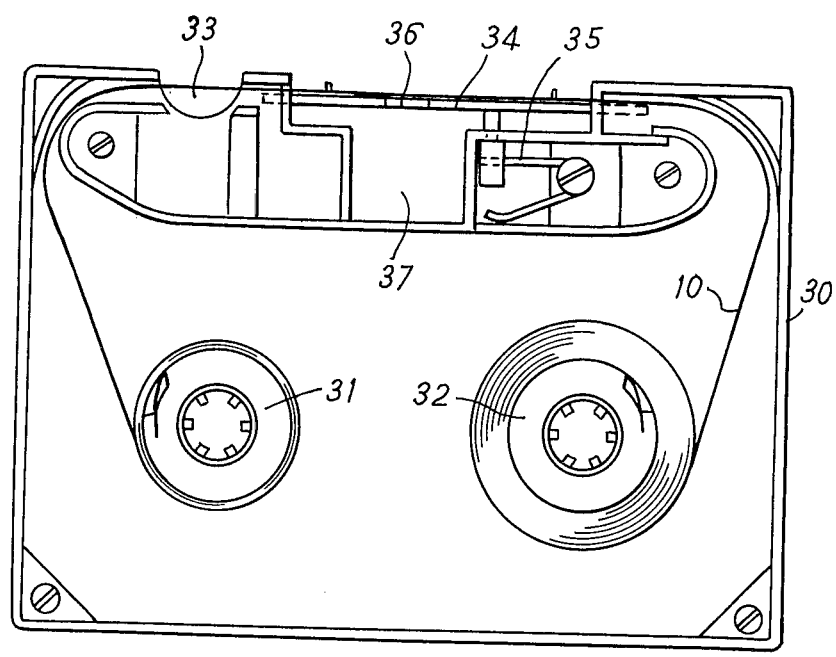
Figure 4:
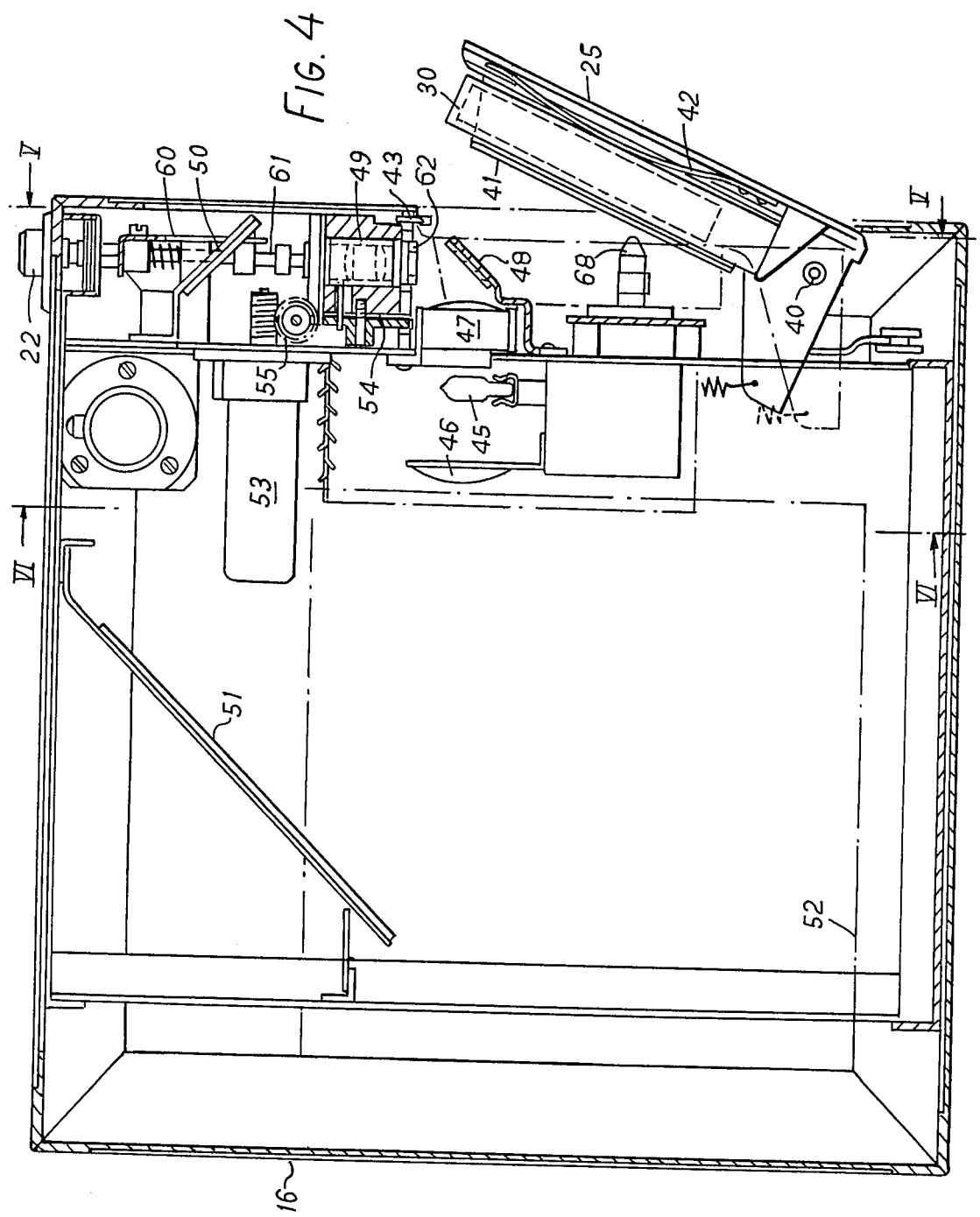
Figure 5:
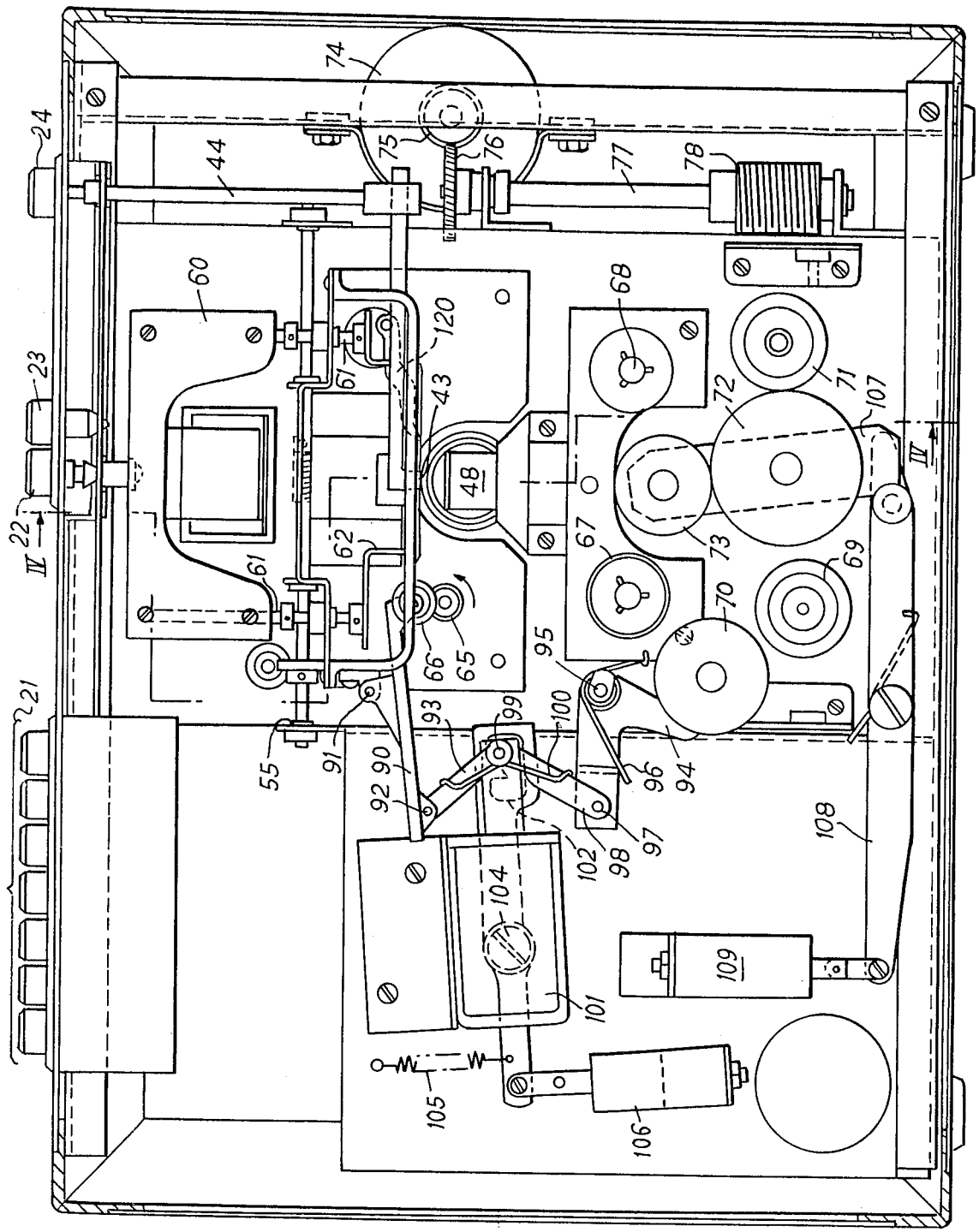
Figure 6:
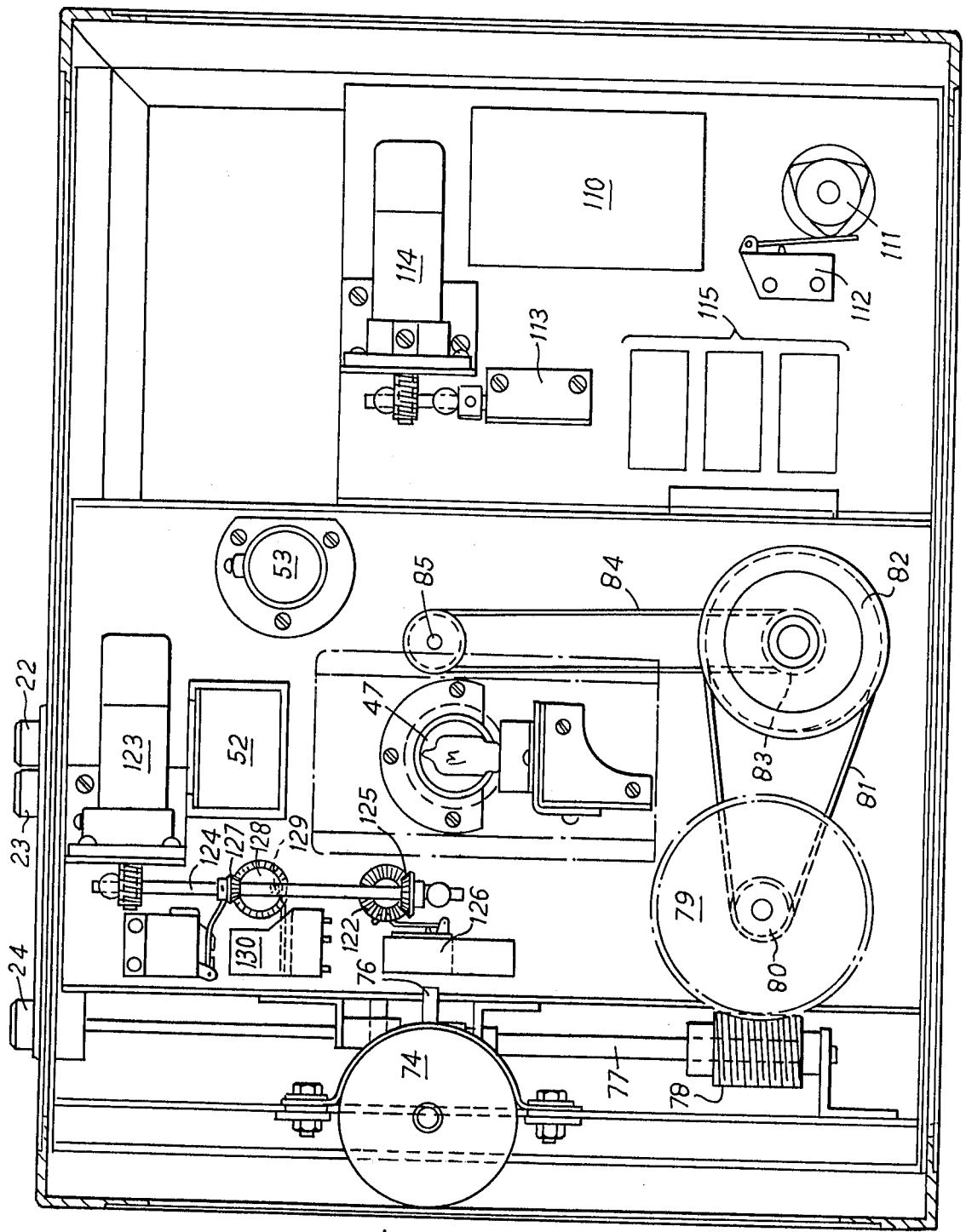

The invention will now be described in more detail with the aid of an example illustrated in the accompanying drawings, in which:

FIG. 1 shows a length of microfilm in accordance with the invention,

FIG. 2 is a general perspective view of reading apparatus for the microfilm of FIG. 1, FIG. 3 is a side view of a transparent cassette in which the microfilm is carried, FIG. 4 is a cross-section of the reading apparatus of FIG. 2 showing the cassette of FIG. 3 in the loading position, FIG. 5 is a view on the line V—V of FIG. 4, and shows the line of section of FIG. 4 at IV—IV, and FIG. 6 is a view on the line VI—VI of FIG. 4.

Referring now to FIG. 1, this shows a strip 10 of microfilm which has been obtained from a strip of standard 16 mm. width by trimming off the perforations to give a final width of 10 mm. A fragment of the text is shown together with a picture 11. The text is in the form of a column 12, made up of lines 13, each of which, it will be seen, is no more than 26 characters long, counting spaces as characters. In advance of the picture 11 there are two perforations 14 and 15 near one edge of the strip 10 and outside the area of the column 12.

FIG. 2 shows the reading apparatus as comprising a rectangular housing 16 with a viewing screen 17 recessed with respect to one end wall 18. The housing 16 has on its top wall 19 a carrying handle 20, a row of push-buttons 21 operating electrical controls, and three push-buttons 22, 23 and 24 for mechanical control operations. A hinged flap 25 in a side wall 26 enables a cassette containing the microfilm record to be mounted in the viewing apparatus as will be described.

FIG. 3 shows a cassette having a casing 30 of transparent synthetic plastics material. Within the cassette casing 30 are mounted two spools 31 and 32 which carry the microfilm strip 10. The side wall of the cassette has openings (not shown) for access of a tape drive to the two spools. The edge of the cassette casing has a cut-out 33 for access of a capstan and pressure roller to the film strip 10. The cassette includes a pressure plate 34 supported by a spring 35. The pressure plate has a projection opening 36 and the cassette wall is recessed at 37 to receive a mirror forming part of the projection system of the reading apparatus 16.

Referring now to FIG. 4 it will be seem that the flap 25 of the viewing apparatu 16 is hinged at 40 to swing out to the position shown in full lines for loading of the cassette 30. The cassette is held between end channel members 41 and a plate spring 42. After insertion of the cassette, the hinged flap 25 is swung inwards to the position shown in broken lines and is locked in position by a latch 43 which is operable by the push button 24 by way of a rod 44 (FIG. 5). The projection system comprises a lamp 45, a concave mirror 46 behind the lamp, a condenser lens system 47, an inclined plane mirror 48 which extends into the recess 37 of the cassette, a projection lens unit 49, inclined mirrors 50 and 51 and a further inclined mirror shown in outline at 52, directing the projected image on to the back of the screen 17. A reversible electric motor 53 driving a snail cam 54 through a worm and wheel gear 55 enables the position of the projector lens unit 49 to be adjusted for focussing by remote control.

After insertion of the cassette, depression of the pushbutton 22, acting through a bridge member 60 (FIG. 5) and sliding rods 61, presses a gate member 62 into engagement with the film strip 10, which is supported by the spring-loaded pressure plate 34. The push button 23 serves to release the gate member 62 and is interlocked with the push-button 24 so that the latter cannot be operated to release the flap 25 until after the film gate has been opened.

For continuous advance of the film strip in the cassette, the reading apparatus has a capstan 65 against which the film is pressed by a push wheel 66. The reading apparatus also has two spool drive spindles 67 and 68 for engagement with the spools in the cassette. The spindle 67 is drivable from a capstan 69 by way of an idler roller 70 and the spindle 68 is drivable from a capstan 71 by way of idler rollers 72 and 73. The capstans 65, 69 and 71 are all continuously driven by a motor 74 which through a worm 75 and worm wheel 76 drives a shaft 77 which carries a second worm 78 driving a worm wheel 79. The worm wheel 79 is on the same shaft as the capstan 71 and thus provides continuous drive to the capstan. Also fixed to the shaft of the worm wheel 79 is a pulley 80 which is linked by a drive belt 81 to a larger pulley 82. The pulley 82 is fixed to the same shaft as the capstan 69 to drive this capstan, and a small pulley 83 is also fixed to the same shaft. The pulley 83 through a drive belt 84, drives a pulley 85 fixed to the shaft of the capstan 65.

The pinch wheel 66 is carried by a lever 90 which is mounted on a pivot 91 and is pivotally connected at 92 to a link 93. The idler roller 70 is carried by one arm of a bell-crank lever 94 mounted on a pivot 95 about which it is biassed in a clockwise direction (as seen in FIG. 5) by a spring 96. The other arm of the lever 94 is pivotally connected at 97 to a link 98 which is pivotally connected at 99 with the link 93. A spring 100 biasses the links 93 and 98 towards one another, thus tending to hold the pinch wheel 66 out of engagement with the capstan 65 and the idler roller 70 out of engagement with the capstan 69 and the spool drive spindle 67. The pivot 99 is however attached to the armature of a solenoid 101 and when this solenoid 101 is energised the pivot 99 is moved to the left (as shown in FIG. 5) to engage the pinch wheel 66 and the idler roller 70. In the course of this movement the pivot 99 moves in a slot 102 in a lever 103 and is latched in the on-position by the lever. The lever 103 which is pivotted at 104, is held in the latching position by a spring 105 but can be disengaged by a solenoid 106.

The spool drive spindle 67 provides a take-up drive to the spool 31 when the film strip 10 is being advanced continuously by the capstan 65. The drive spindle 68 is used for rewind on to the spool 32 and runs at a higher speed. The idler 73 is mounted on the end of a lever 107 pivotted at the centre of the idler 72. The lever 107 is normally held in the position shown by a spring-biassed trip lever 108 but upon release of the trip lever 108 by a solenoid 109 the idler wheel 73 will swing into engagement with the spindle 68 as a result of rotation of the capstan 71 and idler 72 in the direction shown by the The solenoid 109 is energised momentarily by depression of one of the push-buttons 21 which also keeps the motor 74 running in the forward direction as long as it is depressed. After release of the button, operation of a reset button effects a momentary reversal of the motor 74 and hence of the capstan 71 which results in restoration of the lever 107 to the position shown, in which it is again held by the trip lever 108 The gate closure button 22 is interlocked with the reset button so that the gate cannot be closed until idler roller 73 has been disengaged. There is also an interlock to prevent fast rewind or fast forward wind with the gate closed.

The speed of the motor 74 is controllable by an electronic speed control 110 which enables one of three speed ranges to be selected by means of a rotary solenoid 111 actuating one of a stack of three micro switches 112. Within each speed range the speed is continuously variable by means of a rheostat 113 driven by a reversible motor 114. A remote control unit is provided for the user of the viewing apparatus which includes separate controls (a) for focussing by means of the motor 53 (b) for selecting the speed band on the motor 74 (c) for control of the motor 114 to vary the speed of drive and (d) to restart continuous drive after it has been interrupted for display of a picture. These remote controls operate through relays 115.

It was noted in connection with FIG. 1 that in advance of each picture 11 the strip 10 is provided with two perforations 14 and 15. These enable the film strip 10 to be moved by a claw 120 (FIG. 5) which is driven in conventional manner by a disc 121 fixed to a bevel gear 122 (FIG. 6). When the claw 120 enters the perforation 14 of the film it makes an electrical contact to operate a switch (not shown) for starting a motor 123. The motor 123 drives a shaft 124 which carries a bevel gear 125 meshing with the bevel gear 122 to drive the claw. A microswitch 126 is actuated after one revolution of the gear 122 and stops the motor 123. The shaft 124 also carries a bevel gear 127 driving a disc 128 which carries a pin 129. One revolution of gear 122 is accompanied by half a revolution of disc 128 which releases a microswitch 130 to permit the forward movement of the film to be recommenced by actuation of the remote control by the viewer. When this actuation takes place the motor 123 again drives the claw to remove the picture from the gate (the claw engaging the perforation 15 of the film) and during the half-revolution of the disc 128 a microswitch 131 is actuated by the pin 129 to momentarily energise the solenoid 101 for restarting the continuous drive of the film strip 10 by the capstan 65, this having been discontinued when the claw 120 entered the perforation 14.

In the apparatus described the screen 17 is 150 mm. square and is recessed about 50 mm. to reduce reflections and increase brightness. The lines of text, each limited to a total of no more than 26 characters, when projected on the screen are no wider than 50 mm. to eliminate the need for scanning individual lines. The speed of projection of the text can be varied between 60 and 2000 words per minute.

I claim:

1. A microfilm reading system comprising a microfilm record in which reading material is arranged in one or more columns of lines of characters of no more than 26 characters per line and wherein there are illustrations at intervals interspersed with the lines of characters, viewing apparatus having an optical magnification system arranged to present an enlarged image of part of the length of a column to the reader in the appropriate orientation for reading, a drive system for imparting movement to the microfilm relative to the optical magnification system comprising first and second drive means, said first drive means operating to advance the microfilm record continuously and uninterruptedly relative to the optical system such as to enable the viewer to read the successive lines without shifting his eyes from line to line and, by virtue of the restricted length of each line, without lateral movement, and said second drive means being operable to rapidly move a illustration into a position for viewing by the optical system, and sensing means operable to sense an illustration as it appears in one of the columns for effecting operation of said second drive means, said second drive means comprising a pull-down device.

2. A reading system as claimed in claim 1 in which the drive system is controllable to vary the speed of transport.

3. Microfilm reading apparatus as claimed in claim 1 having a cassette holder to receive cassettes having spools on which the microfilm record is wound, said drive system being constructed to engage with the spools of said cassette.

4. Microfilm reading apparatus for presenting to the reader a column of reading material comprising lines of characters not exceeding 26 characters across, including spaces, per line, and at intervals interspersed between lines pictures, said apparatus comprising an optical magnification system which presents an enlarged image of part of the length of a column to the reader in the correct orientation for viewing, a drive system comprising first and second drive means, said first drive means being operable to effect continuous uninterrupted movement of the microfilm in the direction of the column, thereby presenting successive lines of the column to the reader, said second drive means being operable to rapidly move a picture into a position for viewing by the optical system, a sensing device for sensing the approach of a picture on the microfilm record, and means operable thereby for disabling the first drive means and enabling the second drive means and control means operable to restart the first drive means.

5. Mircrofilm reading apparatus as claimed in claim 4 wherein the first drive means includes a driven capstan and a pinch wheel for pressing the microfilm against the capstan and a film take-up drive driven through a transmission capstan, said pinch wheel and said transmission capstan being engageable by a self-locking solenoid acting through levers against a spring, and said disengaging means comprising a trip lever to unlock said solenoid.

* * * * *